US 8,576,153 B2

(12) United States Patent
Park et al.

(10) Patent No.: US 8,576,153 B2
(45) Date of Patent: Nov. 5, 2013

(54) LIQUID CRYSTAL DISPLAY DEVICE AND DRIVING METHOD

(75) Inventors: Ki Bok Park, Gyeonggi-do (KR); Sang Ho Choi, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 1341 days.

(21) Appl. No.: 11/589,586

(22) Filed: Oct. 30, 2006

(65) Prior Publication Data
US 2007/0285369 A1 Dec. 13, 2007

(30) Foreign Application Priority Data
Jun. 12, 2006 (KR) .................. 10-2006-0052737

(51) Int. Cl.
G09G 3/36 (2006.01)
G02F 1/1343 (2006.01)

(52) U.S. Cl.
USPC ........................................... 345/96; 349/144

(58) Field of Classification Search
USPC .............. 345/87–102, 694, 695; 349/37, 41, 349/77–83, 108, 109, 141
See application file for complete search history.

(56) References Cited

U.S. PATENT DOCUMENTS

| 6,707,524 | B2 * | 3/2004 | Kim et al. | 349/141 |
| 6,922,183 | B2 * | 7/2005 | Ting et al. | 345/87 |
| 2005/0253797 | A1 * | 11/2005 | Kamada et al. | 345/89 |

* cited by examiner

*Primary Examiner* — Bipin Shalwala
*Assistant Examiner* — Steven Holton
(74) *Attorney, Agent, or Firm* — Brinks Hofer Gilson & Lione

(57) ABSTRACT

There is disclosed a liquid crystal display device and driving method are provided. The liquid crystal display device includes a liquid crystal display panel where pixels are defined by gate lines and data lines that are arranged in a matrix shape. A gate driver is operable to supply a gate voltage to the liquid crystal display panel. A data driver is operable to supply a data voltage to the liquid crystal display panel. The pixels are each independently operable to be driven by drive voltages, which have different polarities from each other, and include first and second liquid crystal cells which realize the same gray level.

15 Claims, 13 Drawing Sheets

LIQUID CRYSTAL DISPLAY DEVICE AND DRIVING METHOD

This application claims the benefit of the Korean Patent Application No. P06-0052737 filed on Jun. 12, 2006, which is hereby incorporated by reference.

BACKGROUND

1. Field

The present embodiments relate to a liquid crystal display device, and more particularly to a liquid crystal display device that is adaptive for minimizing flickers and residual images, and a driving method thereof.

2. Related Art

A liquid crystal display device controls the light transmittance of liquid crystal by use of an electric field, thereby displaying a picture. Liquid crystal display devices are mainly classified into vertical electric field applying types and horizontal electric field applying types in accordance with the location of the electric field that drives the liquid crystal.

The vertical electric field applying type drives a liquid crystal of TN mode by the vertical electric field formed between a common electrode and a pixel electrode which are opposite in upper and lower substrates. The vertical electric field applying type liquid has a high aperture ratio, but also has a narrow viewing angle of about 90°.

The horizontal electric field applying type drives a liquid crystal of in-plane switch (hereinafter, referred to as 'IPS') mode using a horizontal electric field between a common electrode and a pixel electrode that are disposed to be parallel in a lower substrate. The horizontal electric field applying type has a wide viewing angle of about 160° and a low aperture ratio and transmittance.

In order to improve the low aperture ratio and transmittance of the horizontal electric field applying type, a fringe field switching (hereinafter, referred to as 'FFS') type liquid crystal display device which is driven by a fringe field is used. The FFS type liquid crystal display device includes a pixel electrode and a common electrode plate that has an insulating film therebetween in each pixel area, and forms a gap between the common electrode plate and the pixel electrode to be narrower than a gap between the upper and lower substrates, thereby forming the fringe field. Liquid crystal molecules filled in a space between the upper and lower substrates are operated by the fringe field, thereby improving the aperture ratio and the transmittance.

FIG. 1 is a circuit diagram representing one pixel of a FFS type liquid crystal display device according to the related art. FIG. 2 is a cross sectional diagram illustrating a thin film transistor substrate included in the FFS type liquid crystal display device.

Referring to FIG. 1, the FFS type liquid crystal display device includes a plurality of liquid crystal cells Clc which are arranged in a matrix type at the crossing part of data lines DL and gate lines GL. A TFT formed at each of the liquid crystal cells supplies a data signal from the data line DL to the liquid crystal cell Clc in response to a scan signal supplied from the gate line.

In FIG. 2, a thin film transistor substrate of the FFS type liquid crystal display device includes a gate line GL and a data line DL which are formed to cross with a gate insulating film 22 therebetween on a lower substrate 20. A thin film transistor is formed at each crossing part thereof. A common electrode plate 14 and a pixel electrode slit 18 which are formed with the gate insulating film 22 and a passivation film 28 therebetween so as to form a fringe field in a pixel area provided by the crossing structure. A common line 16 is connected to the common electrode plate 14.

The common electrode plate 14 is formed in each pixel area, and receives a reference voltage (hereinafter, referred to as 'common voltage Vcom') that drives the liquid crystal through the common line 16 which is formed on the common electrode plate 14 and connected to the common electrode plate 114. The common electrode plate 14 is formed of a transparent conductive layer and the common line 16 together with the gate line 2 is formed of a gate metal layer.

The thin film transistor TFT makes the pixel signal of the data line 4 charged and stored in the pixel electrode slit 18 in response to the gate signal of the gate line GL. For example, the thin film transistor TFT includes a gate electrode 6 connected to the gate line GL. A source electrode is connected to the data line 4. A drain electrode 10 is connected to the pixel electrode slit 18. An active layer overlaps the gate electrode 6 with the gate insulating film 22 to form a channel between the source electrode 8 and the drain electrode 10. An ohmic contact layer 26 for an ohmic contact between the source and drain electrodes 8, 10 and the active layer 24. A semiconductor pattern 30 includes the active layer 24 and the ohmic contact layer 26.

The pixel electrode slit 18 is connected to the drain electrode 10 of the thin film transistor TFT through a contact hole 12 which penetrates the passivation film 28 that overlaps the common electrode plate 14. The pixel electrode slit 18 forms a fringe field with a common electrode plate 14 to make liquid crystal molecules rotate by dielectric anisotropy. The liquid crystal molecules are arranged in a horizontal direction between a thin film transistor substrate and a color filter substrate. The transmittance of the light transmitted through a pixel area is changed in accordance with the degree of rotation of the liquid crystal molecules, thereby realizing a gray level.

A storage capacitor Cst that stably maintains the video signal supplied to the pixel electrode slit 18 is formed between the common electrode plate 14 and the pixel electrode slit 18. The storage capacitor Cst stores the voltage of the liquid crystal cell Clc at a fixed level.

The liquid crystal display device is driven by an inversion method of periodically inverting the polarity of the data charged in the liquid crystal cell to reduce flickers and residual images. The inversion method is classified into a line inversion method where the polarity of data is inverted between the adjacent liquid crystal cells in a vertical line direction. A column inversion method has the polarity of data inverted between the adjacent liquid crystal cells in a horizontal line direction. A dot inversion method has the polarity of the data inverted between the adjacent liquid crystal cells in the vertical line direction and the horizontal line direction.

In the dot inversion method, as shown in FIG. 1, the polarities of the data supplied to each of the adjacent liquid crystal cells are contrary to each other in the vertical direction and the polarities of the data supplied to each of the adjacent liquid crystal cells are contrary to each other in the horizontal direction. The polarity of the data is inverted for each frame (Fn−1, Fn).

A feed-through voltage $\Delta Vp$ is generated that results in the flickers and the residual images during the driving of the liquid crystal display device by the dot inversion method.

Referring to FIG. 4, a gate voltage Vg is supplied to the gate electrode 8 of the TFT 6 and a data voltage Vd is supplied to the source electrode 10. If a gate high voltage Vgh being not less than a threshold voltage of the TFT 6 is applied to the gate electrode 8 of the TFT 6, a channel is formed between the source electrode 10 and the drain electrode 12, and the data voltage Vd is charged in the liquid crystal cell Clc and the storage capacitor Cst through the source electrode 10 and the drain electrode 12 of the TFT.

The feed-through voltage $\Delta Vp$ is the difference between the data voltage and the voltage charged in the liquid crystal.

The feed-through voltage $\Delta Vp$ is not fixed because the polarity of the data is inverted for each frame (Fn−1, Fn) or in accordance with the gray level. Thus, the common voltage Vcom is not located in the center of the positive data voltage and the negative data voltage. For example, the feed-through voltage $\Delta Vp$ in the positive data voltage for displaying a white color and the feed-through voltage $\Delta Vp$ in the negative data voltage for displaying a white color are not the same in magnitude, thus an effective value of the data voltage for expressing the same gray level is not fixed in accordance with the polarity. Accordingly, the common voltage being a DC voltage cannot be set as an optimal common voltage value corresponding to the center of the positive data voltage and the negative data voltage. A brightness difference is generated between frames, thereby still resulting in the flickers and the residual images.

Accordingly, a liquid crystal display device that is adaptive for minimizing flickers and residual images is desired.

SUMMARY

In one embodiment, a liquid crystal display device includes a liquid crystal display panel where pixels defined by gate lines and data lines are arranged in a matrix shape. A gate driver supplies a gate voltage to the liquid crystal display panel. A data driver supplies a data voltage to the liquid crystal display panel, and the pixels are each independently driven by drive voltages of which the polarities are different from each other, and include first and second liquid crystal cells which realize the same gray level.

In one embodiment, each pixel is defined by one gate line that crosses a first data line to which a first data voltage is supplied and a second data line to which a second data voltage is supplied.

In one embodiment, polarities of the first and second data voltages are inverted for each frame.

In the liquid crystal display device, the first liquid crystal cell includes a first thin film transistor located at the crossing area of the gate line and the first data line, a first pixel electrode connected to the first thin film transistor, and a common voltage supplier which forms an electric field with the first pixel electrode. The second liquid crystal cell includes a second thin film transistor located at the crossing area of the gate line and the second data line, a second pixel electrode connected to the second thin film transistor, and the common voltage supplier which forms an electric field with the second pixel electrode.

In the liquid crystal display device, the polarity of a pixel voltage supplied to each of the first and second liquid crystal cells is inverted for each frame.

In the liquid crystal display device, the first and second liquid crystal cells have a symmetric structure to each other.

In the liquid crystal display device, the first and second pixel electrodes include a plurality of line-shaped finger parts that are parallel to the data line.

In the liquid crystal display device, the common voltage supplier includes a common electrode plate that is formed in a pixel area where the pixel is provided and which forms a fringe electric field with the first and second pixel electrodes. A common line supplies a common voltage to the common electrode plate.

In the liquid crystal display device, the common voltage supplier includes a finger-shaped common electrode which is located parallel to the finger parts of the first and second pixel electrodes to form a horizontal electric field with the finger part.

In the liquid crystal display device, each of the pixels is defined by one data line and first and second gate lines.

In the liquid crystal display device, a first data voltage synchronized with a first gate voltage from the first gate line is supplied to the data line. A second data voltage synchronized with a second gate voltage from the second gate line is supplied to the data line.

In the liquid crystal display device, the first data voltage and the second data voltage have different polarities from each other.

In the liquid crystal display device, the polarities of the first and second data voltages are inverted for each frame.

In the liquid crystal display device, the first liquid crystal cell includes a first thin film transistor located at the crossing area of the first gate line and the data line, a first pixel electrode connected to the first thin film transistor, and a common voltage supplier which forms an electric field with the first pixel electrode; and the second liquid crystal cell includes a second thin film transistor located at the crossing area of the second gate line and the data line, a second pixel electrode connected to the second thin film transistor, and the common voltage supplier which forms an electric field with the second pixel electrode.

In the liquid crystal display device, the polarity of a pixel voltage supplied to each of the first and second liquid crystal cells is inverted for each frame.

In the liquid crystal display device, the first and second pixel electrodes include a plurality of line-shaped finger parts which are parallel to the data line.

In the liquid crystal display device, the common voltage supplier includes a common electrode plate which is formed in a pixel area where the pixel is provided and which forms a fringe electric field with the first and second pixel electrodes. A common line supplies a common voltage to the common electrode plate.

In the liquid crystal display device, the common voltage supplier includes a common electrode located parallel to the finger parts of the first and second pixel electrodes to form a horizontal electric field with the finger part.

In the liquid crystal display device, the pixel realizes any one color of red, green and blue.

A driving method of a liquid crystal display device having a liquid crystal display panel where pixels are arranged in a matrix shape according to another aspect of the present invention includes the steps of dividing each of the pixels into first and second liquid crystal cells which can be independently driven; supplying a common voltage to the first and second liquid crystal cells; and realizing the same gray level in the first and second liquid crystal cells by supplying the drive voltages, which are the same in magnitude on the basis of the common voltage and different in polarity, to the first and second liquid crystal cells.

In the driving method, the polarity of a drive voltage supplied to each of the first and second liquid crystal cells are inverted for each frame.

In the driving method, the first liquid crystal cell is defined by a gate line and a first data line to which a first data voltage is supplied. The second liquid crystal cell is defined by the gate line and a second data line to which a second data voltage, which has a different polarity from the first data voltage, is supplied.

In the driving method, the first liquid crystal cell is defined by a data line and a first gate line to which a first gate voltage is supplied. The second liquid crystal cell is defined by the data line and a second gate line to which a second gate voltage is supplied.

In the driving method, realizing the same gray level in the first and second liquid crystal cells includes the steps of realizing a first gray level in the first liquid crystal cell by supplying the first gate voltage to the first gate line and supplying a first data voltage synchronized with the first gate voltage to the data line. Realizing the same gray level as the first gray level in the second liquid crystal cell by supplying the second gate voltage to the second gate line and supplying a second data voltage synchronized with the second gate voltage to the data line.

In the driving method, the first data voltage and the second data voltage have different polarities from each other.

In the driving method, the polarities of the first and second data voltages are inverted for each frame.

In the driving method, liquid crystals of the first and second liquid crystal cells are driven by a fringe electric field between the drive voltage and the common voltage.

In the driving method, liquid crystals of the first and second liquid crystal cells are driven by a horizontal electric field between the drive voltage and the common voltage.

The driving method further includes the step of optimizing the magnitude of the common voltage between a first drive voltage supplied to the first liquid crystal cell and a second drive voltage supplied to the second liquid crystal cell after realizing the same gray level in the first and second liquid crystal cells.

DETAILED DESCRIPTION

In one embodiment, the liquid crystal display device divides the pixel realizing any one color of red R, green G and blue B into first and second sub-pixels which have different polarities and have the same gray level at the same time. The first and second sub-pixels express the same gray level, but any one of the first and second sub-pixels express the gray level by a positive data and the other expresses the gray level by a negative data. The positive and negative data are simultaneously realized within one pixel even though the magnitude of the feed-through voltage $\Delta Vp$ is not identical. The effective value that expresses the gray level can be stored regardless of the polarity at a fixed level. The same brightness can be expressed irrespective of the common voltage value and the magnitude of the feed-through voltage for each frame (Fn−1, Fn), thereby solving the flicker problem.

For example, the driving by the positive and negative data is all possible within each pixel. A user sets an optimal common voltage value corresponding to the center of a positive data voltage and a negative data voltage while the flick problem is solved, thus it is possible to minimize the residual image. The same brightness is expressed regardless of the location of the common voltage for each frame (Fn−1, Fn). If the common voltage value is set as an optimal value with which the residual image is minimized between the positive data voltage and the negative data voltage after removing the flickers, then the flickers and the residual images can be minimized.

Hereinafter, embodiments for representing the foregoing operational effect will be specifically explained in reference to the drawings.

Figure 1:
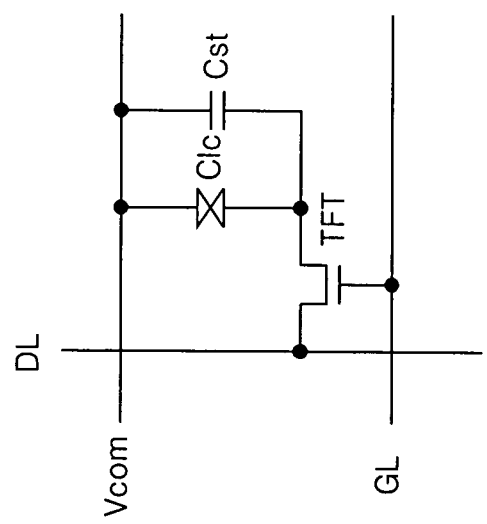
FIG. 1 is a circuit diagram briefly representing one pixel in an FFS type liquid crystal display device according to the related art.
Figure 2:
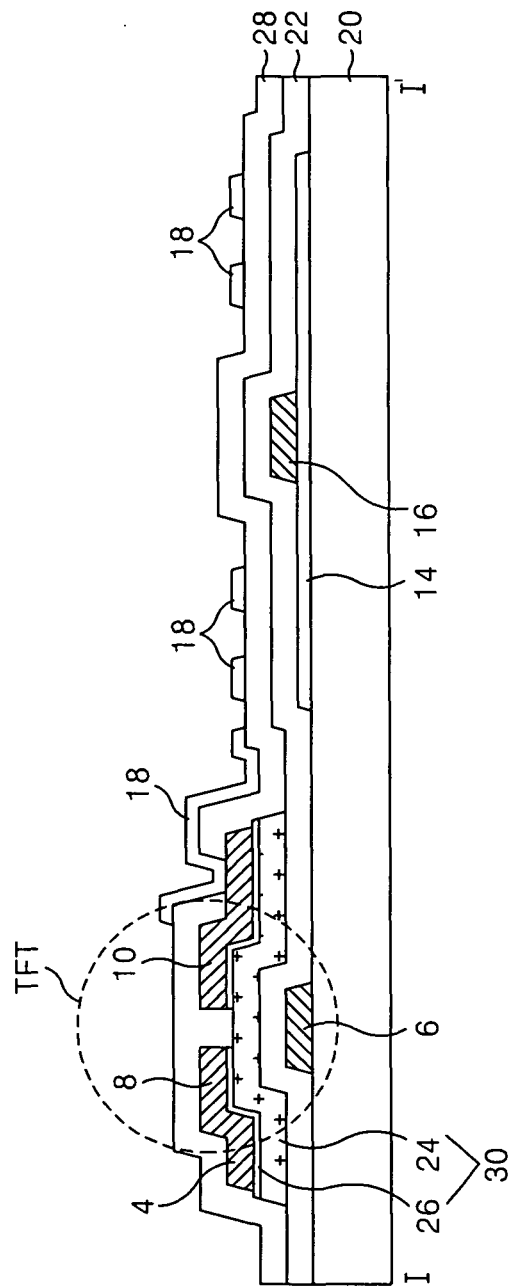
FIG. 2 is a cross sectional diagram representing a thin film transistor array substrate of the FFS type liquid crystal display device according to the related art.
Figure 3:
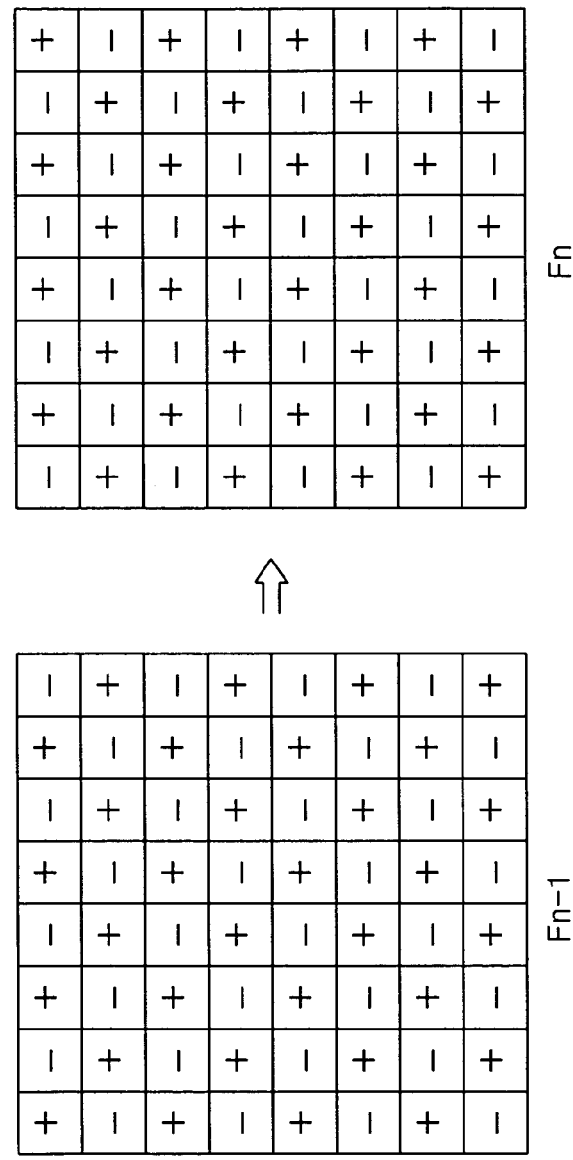
FIG. 3 is a diagram briefly representing a data polarity of a liquid crystal display panel which is driven by a dot inversion method according to the related art.
Figure 4:
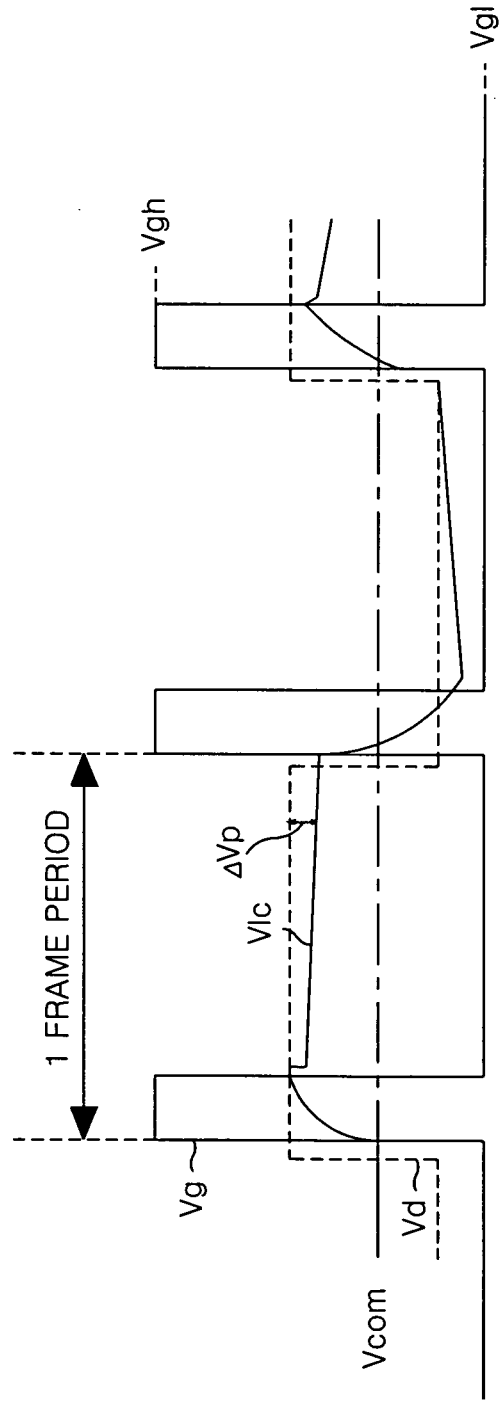
FIG. 4 is a waveform diagram representing a drive characteristic of a liquid crystal display device of a dot inversion method according to the related art.
Figure 5:
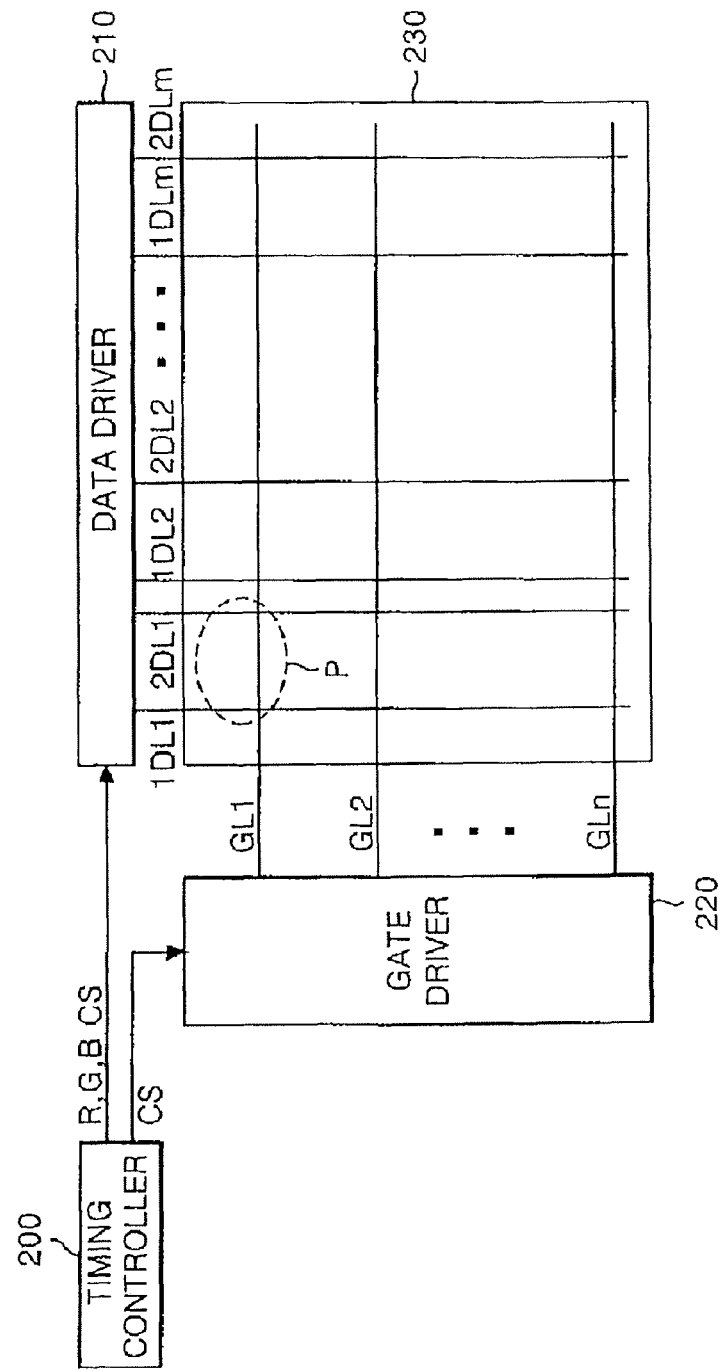
FIG. 5 is a block diagram briefly representing a liquid crystal display device according to one embodiment.

FIG. 5 is a block diagram briefly representing a liquid crystal display device according to a first embodiment.

Referring to FIG. 5, the liquid crystal display device includes a liquid crystal display panel 230 where m×n pixels P are arranged in a matrix type. A data driver 210 supplies first and second data voltages to first and second data lines 1DL1, 2DL1, 1DL2, 2DL2, . . . , 1DLm, 2DLm of the liquid crystal display panel 230. A gate driver 220 supplies a gate voltage to the gate lines G1 to Gn. A timing controller controls the data driver 210 and the gate driver 220 by use of a synchronization signal.

The liquid crystal display panel 230 includes a thin film transistor array substrate and a color filter array substrate which face each other with liquid crystal therebetween.

The data driver 210 converts a digital video data RGB into an analog gamma voltage (data signal) that corresponds to the gray level value in response to a control signal CS from the timing controller 200, and supplies the analog gamma voltage to the first and second data lines 1DL1, 2DL1, 1DL2, 2DL2, . . . , 1DLm, 2DLm.

The gate driver 220 sequentially supplies a gate voltage to the gate lines GL1 to GLn to select a horizontal line of a liquid crystal display panel 230 to which a data signal is supplied in response to the control signal CS from the timing controller 200.

The timing controller 200 generates a control signal CS that controls the gate driver 220 and the data driver 210 by use of a vertical/horizontal synchronization signal Vsync, Hsync and a clock signal DCLK.

Figure 6:
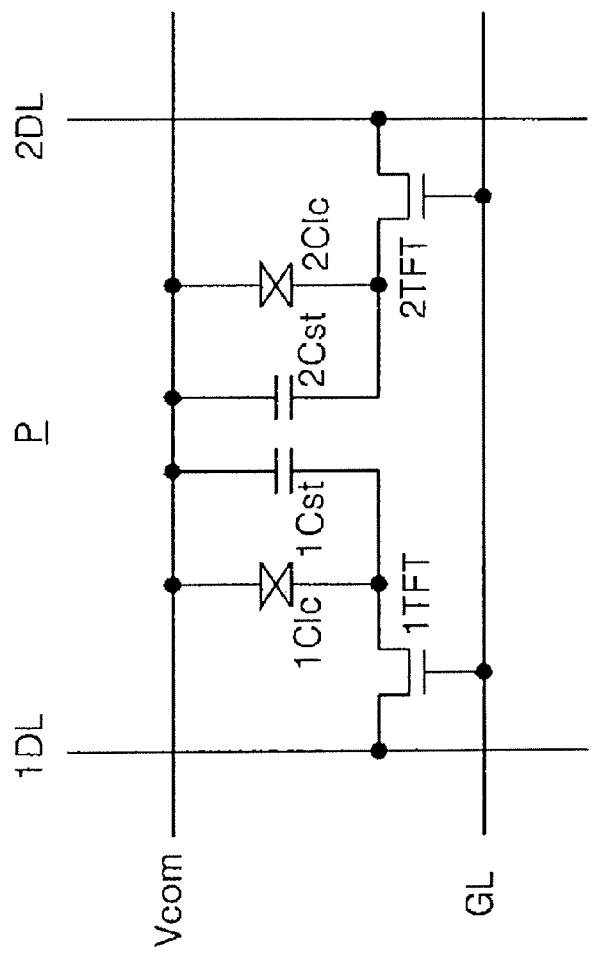
FIG. 6 is a circuit diagram specifically representing one pixel in FIG. 5.

FIG. 6 is a circuit diagram briefly representing one pixel of FIG. 5. As shown in FIG. 6, each pixel includes first and second data lines 1DL, 2DL. Gate lines cross the first and second data lines 1DL, 2DL. A first thin film transistor 1TFT and a first liquid crystal cell 1Clc are formed at the crossing area of the first data line 1DL and the gate line GL. A second thin film transistor 2TFT and a second liquid crystal cell 2Clc are formed at the crossing area of the second data line 2DL and the gate line GL.

In one embodiment, the first thin film transistor 1TFT supplies the positive (or negative) data voltage from the first data line 1DL to the first liquid crystal cell 1Clc in response to a scan signal (or gate voltage) supplied from the gate line GL. The second thin film transistor 2TFT supplies the negative (or positive) data voltage from the second data line 2DL to the second liquid crystal cell 2Clc in response to the gate voltage supplied from the gate line GL. The data voltage supplied from the first data line 1DL and the data voltage supplied from the second data line 2DL are the same in magnitude and contrary to each other in polarity. Each of the liquid crystal cells 1Clc, 2Clc can be independently driven, thus one pixel can be divided into two sub-pixels which realizing the same color.

Figure 7:
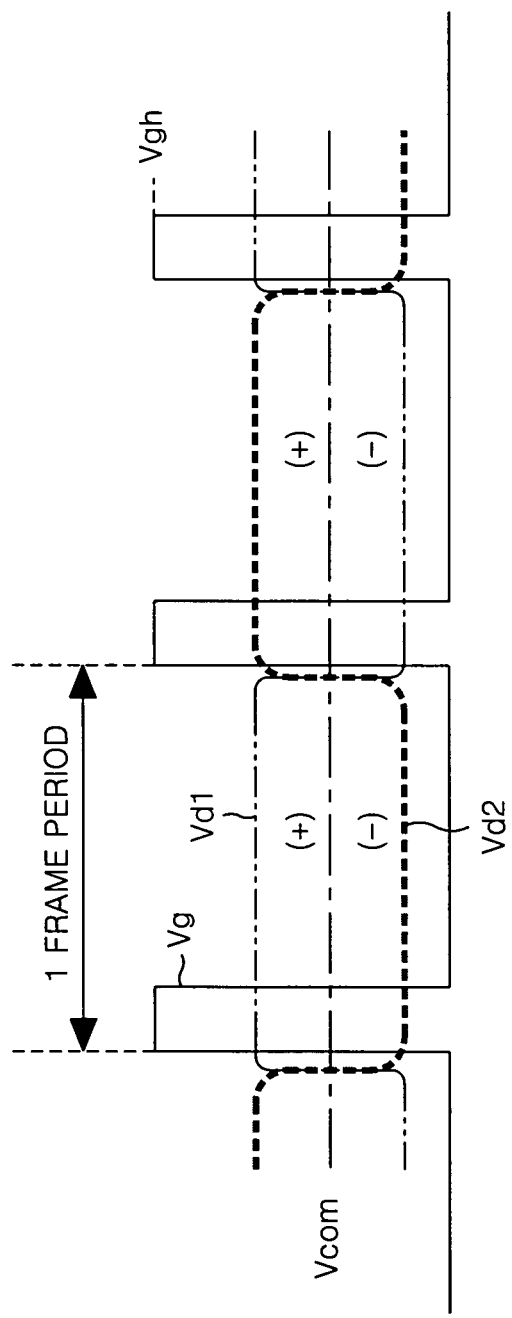
FIG. 7 is a waveform diagram representing a drive characteristic of the liquid crystal display device according the first embodiment.

FIG. 7. illustrates a drive characteristic of a liquid crystal display device according to the first embodiment. As shown in FIG. 7, a gate voltage Vg is supplied to gate electrodes of the first and second thin film transistors 1TFT, 2TFT. A first data voltage Vd1 is supplied to a source electrode of the first thin film transistor 1TFT and a second data voltage Vd2 is supplied to a source electrode of the second thin film transistor 2TFT. A difference voltage between the common voltage Vcom and the first data voltages Vd1 is the same in magnitude as a difference voltage between the common voltage Vcom and the second data voltages Vd2, and the polarities of the first and second data voltages Vd1, Vd2 are contrary to each other.

Alternatively, if the common voltage Vcom is 0V even though the first data voltage Vd1 and the second data voltage Vd2 have the same polarity, the first data voltage Vd1 and the second data voltage Vd2 are contrary to each other in polarity, and the polarities of the first and second data voltages Vd1, Vd2 become contrary thereto in the next frame in comparison with the previous frame.

If a gate high voltage Vgh of not less than a threshold voltage of the first thin film transistor 1TFT is applied to the gate electrode of the first thin film transistor 1TFT, a channel is formed between the source electrode and the drain electrode, and the first data voltage 1Vd is charged in the first liquid crystal cell 1Clc and the first storage capacitor 1Cst through the source electrode and the drain electrode of the first thin film transistor 1TFT.

If the gate high voltage Vgh of not less than a threshold voltage of the second thin film transistor 2TFT is applied to the gate electrode of the second thin film transistor 2TFT, a channel is formed between the source electrode and the drain electrode, and the second data voltage 2Vd is charged in the second liquid crystal cell 2Clc and the second storage capacitor 2Cst through the source electrode and the drain electrode of the second thin film transistor 2TFT.

Each pixel having the foregoing circuit and composition characteristic can be divided into first and second liquid crystal cells (or sub-pixels) which express the same gray level while having different polarities from each other. Accordingly, the positive and negative data are simultaneously realized within one pixel even though the level of the feed-through voltage ΔVp is not identical. Thus, the effective value for expressing the gray level is fixed. The same brightness can be expressed irrespective of the location of the common voltage and the magnitude of the feed-through voltage ΔVp for each frame (Fn−1, Fn), thereby solving the flicker problem.

The driving by the positive and negative data is all possible within each pixel. For example, a user may judge the common voltage value that can minimize the residual image between the positive (+) data voltage and the negative (−) data voltage while the flicker problem is solved.

In one embodiment, the same brightness is expressed regardless of the location of the common voltage for each frame (Fn−1, Fn). If the common voltage value is set as an optimal value with which the residual image is minimized between the positive data voltage and the negative data voltage after removing the flickers, then the flickers and the residual images can be minimized.

Figure 8:
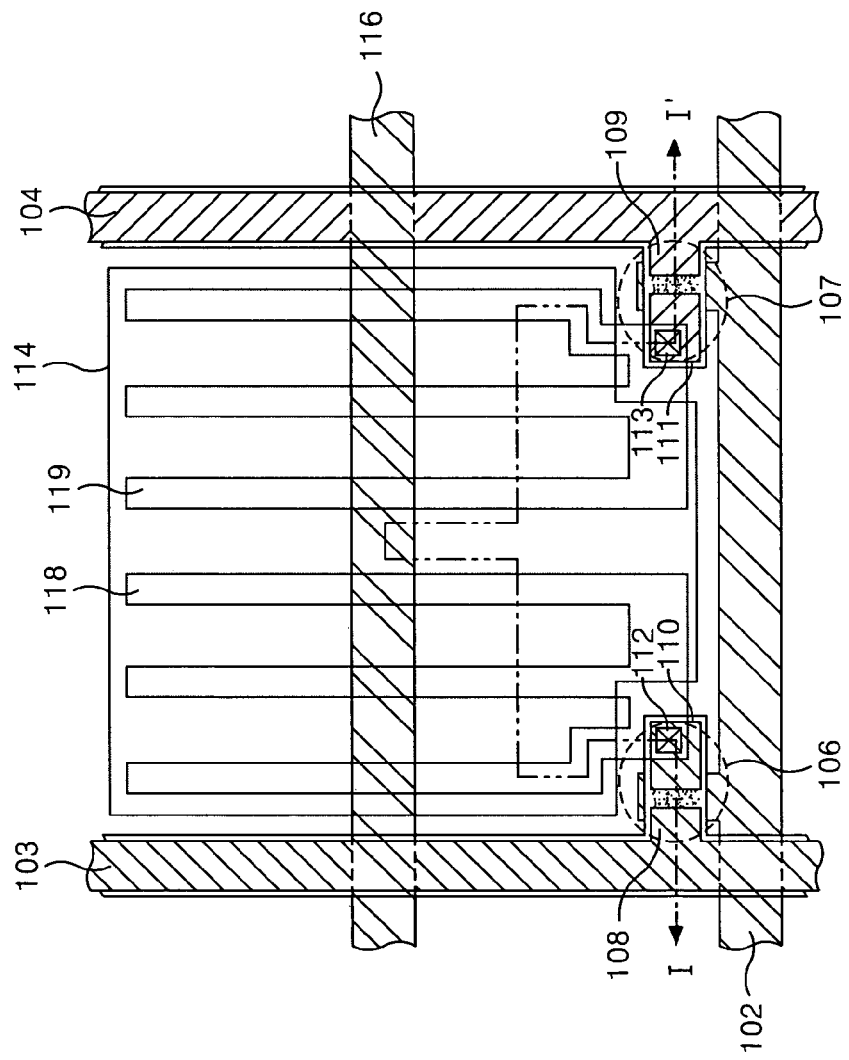
FIG. 8 is a plan view representing a thin film transistor array substrate of an FFS type liquid crystal display device.
Figure 9:
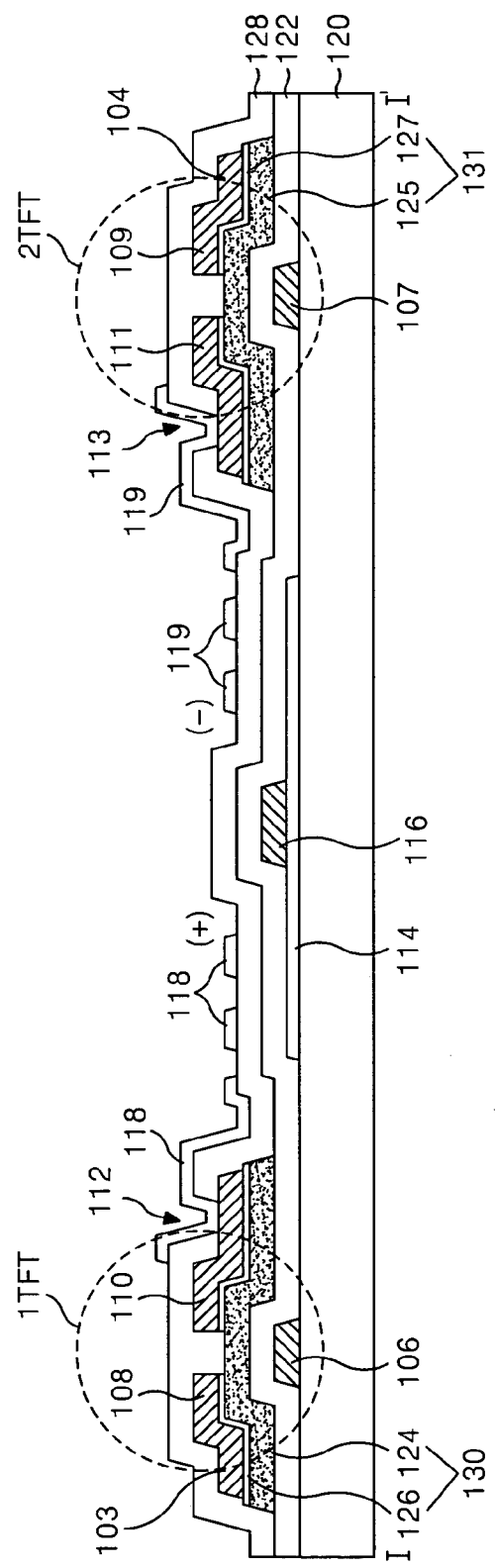
FIG. 9 is a cross sectional diagram illustrating the thin film transistor array substrate taken along the line I-I' of FIG. 8.

FIGS. 8 and 9 are a plan view and a cross sectional diagram representing a structure of an FFS (fringe field switch) type thin film transistor array substrate where, for example, the circuit composition and drive shown in FIGS. 6 and 7 is possible.

The thin film transistor substrate of the FFS type liquid crystal display device shown in FIGS. 8 and 9 includes first and second data lines 103, 104 which cross a gate line 102 with a gate insulating film 122 therebetween on a lower substrate 120. A first thin film transistor 1TFT is formed at the crossing area of the first data line 103 and the gate line 102. A second thin film transistor 2TFT formed at the crossing area of the second data line 104 and the gate line 102. A common electrode plate 114 and first and second electrode slits 118, 119 are formed with a gate insulating film 122 and a passivation film 128 therebetween so as to form a fringe field in a pixel area defined by the gate line 102 and the first and second data lines 103, 104. A common line 116 is connected to the common electrode plate 114.

The common electrode plate 114 is formed in each pixel area, and receives a common voltage Vcom (or reference voltage) for driving liquid crystal through the common line 116 which is formed on the common electrode plate 114 to be connected thereto. The common electrode plate 114 is formed of a transparent conductive layer. The common line 116 together with the gate line 102 is formed of a gate metal layer.

The first thin film transistor 1TFT makes a pixel signal of the first data line 103 charged and stored in the first pixel electrode slit 118 in response to the gate signal of the gate line 102. For example, the first thin film transistor 1TFT includes a first gate electrode 106 connected to the gate line 102. A first source electrode 108 is connected to the first data line 103. A first drain electrode 110 is connected to the first pixel electrode slit 118. A first active layer 124 overlaps the first gate electrode 106 with the gate insulating film 22 therebetween and forms a channel between the first source electrode 108 and the first drain electrode 110. A first ohmic contact layer 126 for the ohmic contact between the first source and first drain electrodes 108, 110 and the first active layer 124. A first semiconductor pattern 130 includes the first active layer 124 and the first ohmic contact layer 126.

The first pixel slit 118 is connected to the first drain electrode 110 of the first thin film transistor 1TFT through a first contact hole 112 which penetrates the passivation film 128, and is formed to overlap the common electrode 114.

The second thin film transistor 2TFT makes the pixel signal of the second data line 104 charged and kept in the second pixel electrode slit in response to the gate signal of the gate line 102. For example, the second thin film transistor 2TFT includes a second gate electrode 107 connected to the gate line 102. A second source electrode 109 is connected to the second data line 104. A second drain electrode 111 is connected to the second pixel electrode slit 119. A second active layer 125 overlaps the second gate electrode 107 with the gate insulating film 122 therebetween and forms a channel between the second source electrode 109 and the second drain electrode 111. A second ohmic contact layer 127 provides an ohmic contact between the second source and second drain electrodes 109, 111 and the second active layer 125. A second semiconductor pattern 131 includes the second active layer 125 and the second ohmic contact layer 127.

The second pixel slit 119 is connected to the second drain electrode 111 of the second thin film transistor 2TFT through a second contact hole 113 which penetrates the passivation film 128, and is formed to overlap the common electrode 114. The first and second electrode slits 118, 119 are made of a plurality of finger parts of a finger shape that are formed parallel to the data lines 103, 104.

In one embodiment, the FFS type liquid crystal display device with such a configuration forms a first fringe field between the common electrode plate 114 and the positive (+) voltage (or negative voltage) in the first pixel electrode slit 118, and forms a second fringe field between the common electrode plate 114 and the negative (−) voltage in the second pixel electrode slit 119. For example, liquid crystal molecules arranged in a horizontal direction between a thin film transistor substrate and a color filter substrate are rotated by dielectric anisotropy. Accordingly, it is possible to form two kinds of fringe fields having different polarities from each other within one pixel.

Accordingly, the same brightness can be expressed irrespective of the location of the common voltage and the magnitude of the feed-through voltage ΔVp for each frame (Fn−1, Fn), for example, solving the flicker problem. In one embodiment, at the same time, as the driving by the positive and negative data is all possible within each pixel, a user sets an optimal common voltage value corresponding to the center of a positive data voltage and a negative data voltage while the flick problem is solved. Accordingly, it is possible to minimize the residual image.

Figure 10:
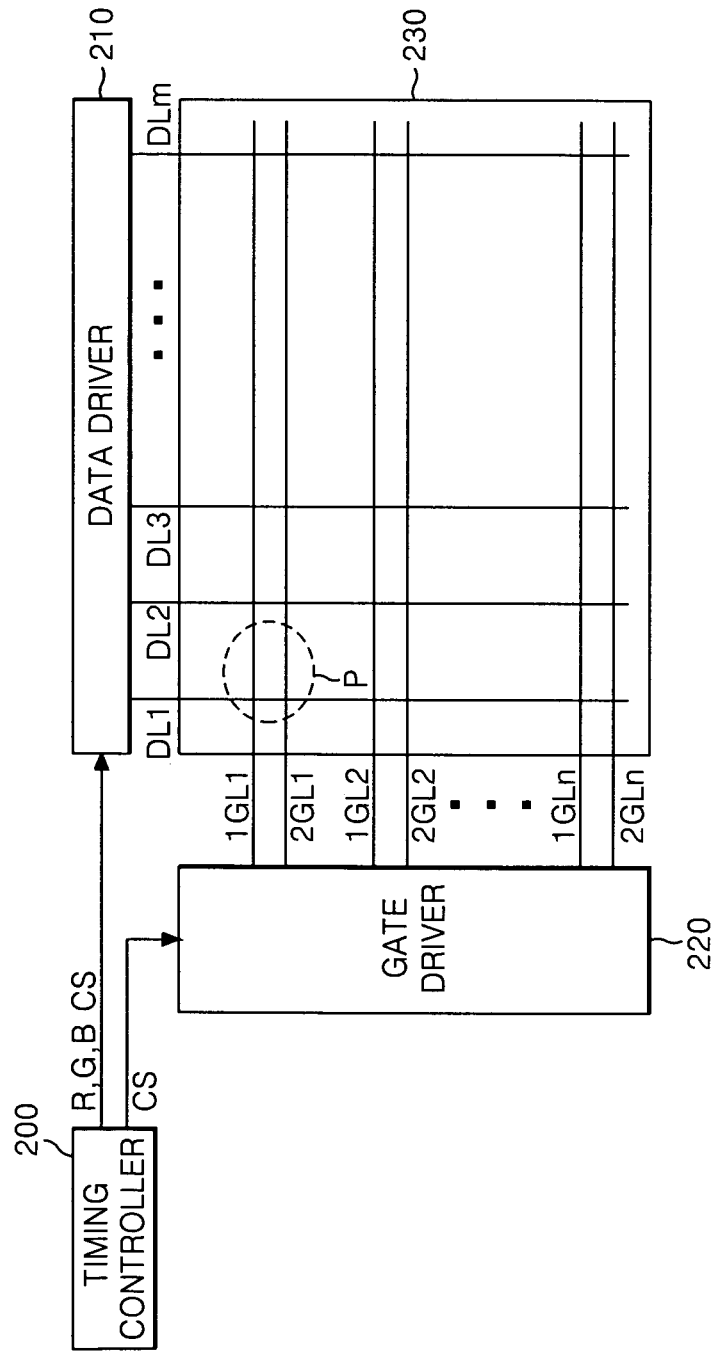
FIG. 10 is a block diagram briefly representing a liquid crystal display device according to a second embodiment.
Figure 11:
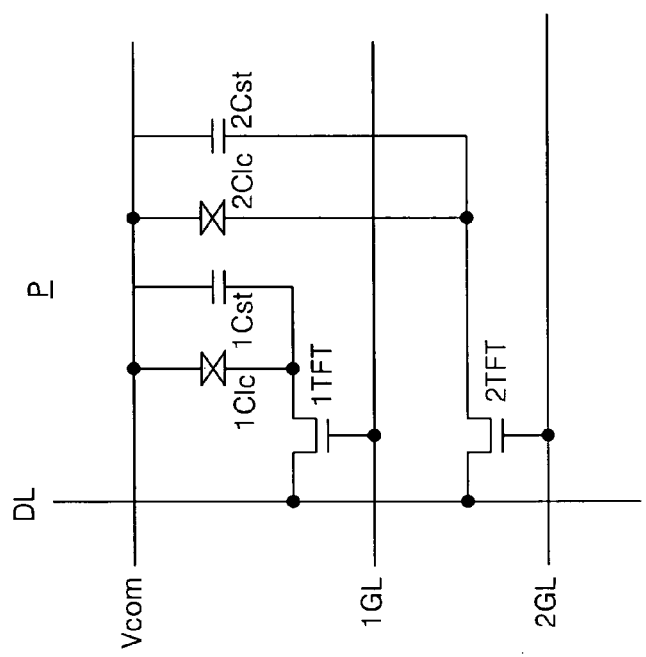
FIG. 11 is a circuit diagram specifically representing one pixel in FIG. 10.

FIG. 10 is a block diagram illustrating a liquid crystal display device according to a second embodiment. FIG. 11 is a circuit diagram briefly representing one pixel P, for example, in FIG. 10.

In the liquid crystal display device shown in FIGS. 10 and 11, one pixel P is defined by one data line DL and first and second gate lines 1GL, 2GL. The liquid crystal display device according to the second embodiment is substantially the same in structure as that of the first embodiment except, for example, the above difference. Accordingly, the same configuration as the first embodiment will be given the same reference numeral, and the repeated explanation will be omitted.

The liquid crystal display device includes a liquid crystal display panel 230 where m×n pixels P are arranged in a matrix type. A gate driver 220 supplies first and second gate voltages to first and second gate lines 1GL1, 2GL1, 1GL2, 2GL2, ..., 1GLm, 2GLm of the liquid crystal display panel 230. A data driver 210 supplies first and second data voltages to the data lines DL1 to DLm. A timing controller 200 controls the data driver 210 and the gate driver 220 by use of a synchronization signal.

The data driver 210 converts a digital video data RGB into an analog gamma voltage (data signal) corresponding to the gray level value in response to a control signal CS from the timing controller 200, and supplies the analog gamma voltage to the data lines DL1 to DLm.

The gate driver 220 sequentially supplies a gate voltage to the gate lines 1GL1, 2GL1, 1GL2, 2GL2, ..., 1GLn, 2GLn to select a horizontal line of a liquid crystal display panel 230 to which a data signal is supplied in response to the control signal CS from the timing controller 200.

As shown in FIG. 11, each pixel P includes first and second gate lines 1GL, 2GL. Data lines DL cross the first and second gate lines 1GL, 2GL. A first thin film transistor 1TFT and a first liquid crystal cell 1Clc are formed at the crossing area of the first gate line 1GL and the data line DL. A second thin film transistor 2TFT and a second liquid crystal cell 2Clc are formed at the crossing area of the second gate line 2GL and the data line DL.

The first thin film transistor 1TFT supplies the positive (or negative) first data voltage from the data lines DL to the first liquid crystal cell 1Clc in response to a first gate voltage supplied from the first gate line 1GL. The second thin film transistor 2TFT supplies the negative (or positive) second data voltage from the data lines DL to the second liquid crystal cell 2Clc in response to the second gate voltage supplied from the second gate line 2GL.

The first data voltage is supplied from the data line DL and synchronized with the first gate voltage and the second data voltage which is supplied from the data line DL and synchronized with the second gate voltage are the same in magnitude and contrary to each other in polarity. Accordingly, one pixel is also made of two liquid crystal cells 1Clc, 2Clc which can be independently driven in the second embodiment. Accordingly, one pixel can be divided into two sub-pixels which realize the same color.

Figure 12:
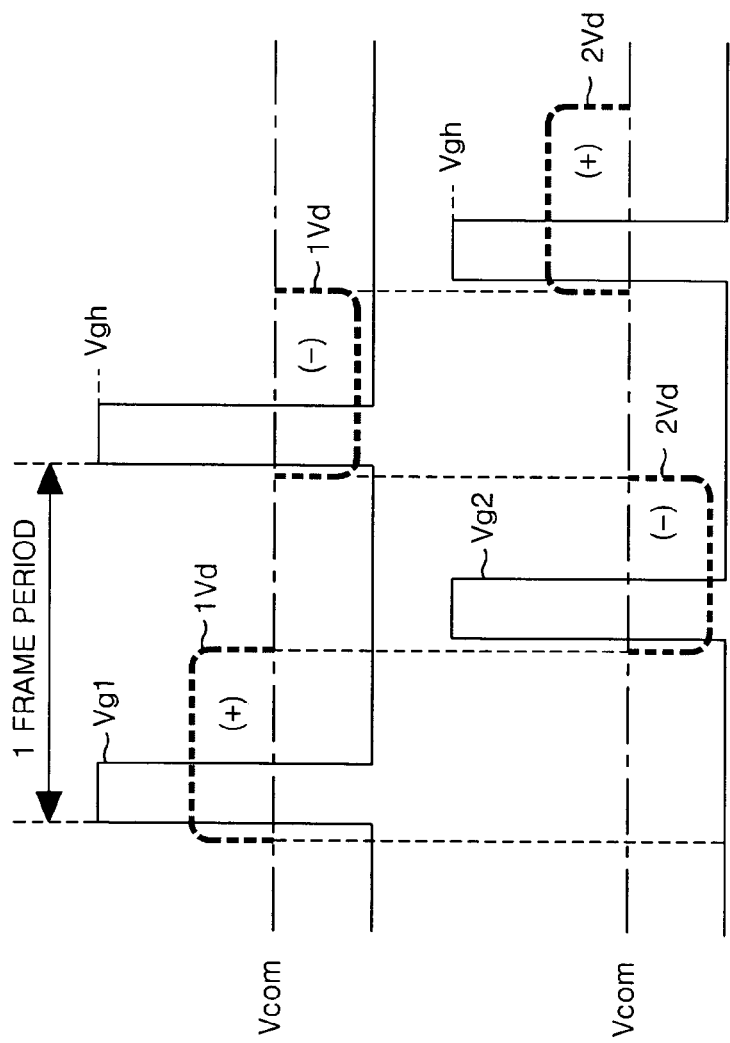
FIG. 12 is a waveform diagram representing a drive characteristic of the liquid crystal display device according to the second embodiment.

The drive characteristic of the liquid crystal display device according to the second embodiment will be explained as follows in reference to FIG. 12. As shown in FIG. 12, a first gate voltage Vg1 is supplied to the gate electrode of the first thin film transistor 1TFT and a positive (or negative) first data voltage 1Vd is supplied to the source electrode of the first thin film transistor 1TFT. A second gate voltage Vg2 is supplied to the gate electrode of the second thin film transistor 2TFT and a negative (or positive) second data voltage 2Vd is supplied to the source electrode of the second thin film transistor 2TFT. For example, the first and second thin film transistors 1TFT, 2TFT within one pixel are sequentially turned on by the first and second gate voltages Vg1, Vg2, and sequentially supply the first and second data voltages 1Vd, 2Vd, which are sequentially supplied from one data line DL and of which the polarities are different from each other, to the first and second liquid crystal cells 1Clc, 2Clc.

In order to supply the gate voltage twice within one pixel for one frame, the gate driver 220 that supplies the gate voltage and the data driver 210 that supplies the data voltage are driven at double the speed. For example, if the liquid crystal display device is driven at 60 Hz in the first embodiment of the present invention, the liquid crystal display device is driven at 120 Hz in the second embodiment.

In one embodiment, a voltage difference between the common voltage Vcom and the first data voltages 1Vd is the same in magnitude as a voltage difference between the common voltage Vcom and the second data voltages 2Vd. The polarities of the first and second data voltages 1Vd, 2Vd are contrary to each other. If the common voltage Vcom is 0V even though the first data voltage 1Vd and the second data voltage 2Vd have the same polarity, the first data voltage 1Vd and the second data voltage 2Vd are contrary to each other in polarity. The polarities of the first and second data voltages 1Vd, 2Vd become contrary thereto in the next frame in comparison with the previous frame.

In one embodiment, each pixel is divided into the first and second liquid crystal cells (or sub-pixels) that express the same gray level while having different polarities from each other. Accordingly, the same operation and effect as the first embodiment can be derived. For example, the positive and negative data are simultaneously realized within one pixel even though the magnitude of the feed-through voltage ΔVp is not identical. The effective value for expressing the gray level can be fixed. Accordingly, the same brightness can be expressed irrespective of the location of the common voltage and the magnitude of the feed-through voltage ΔVp for each frame (Fn−1, Fn), and the common voltage is optimized, thereby making it possible to minimize the flickers and the residual images.

In one embodiment, one pixel P is defined by one data line DL and the first and second gate lines 1GL, 2GL. For example, the source electrodes of the first and second thin film transistors 1TFT, 2TFT are each connected to the data line DL. The gate electrode of the first thin film transistor 1TFT is connected to the first gate line 1GL and the gate electrode of the second thin film transistor 2TFT is connected to the second gate line 2GL. The thin film transistor array substrate according to the second embodiment is the same in structure as that of the first embodiment except, for example, such a structural difference.

Figure 13:
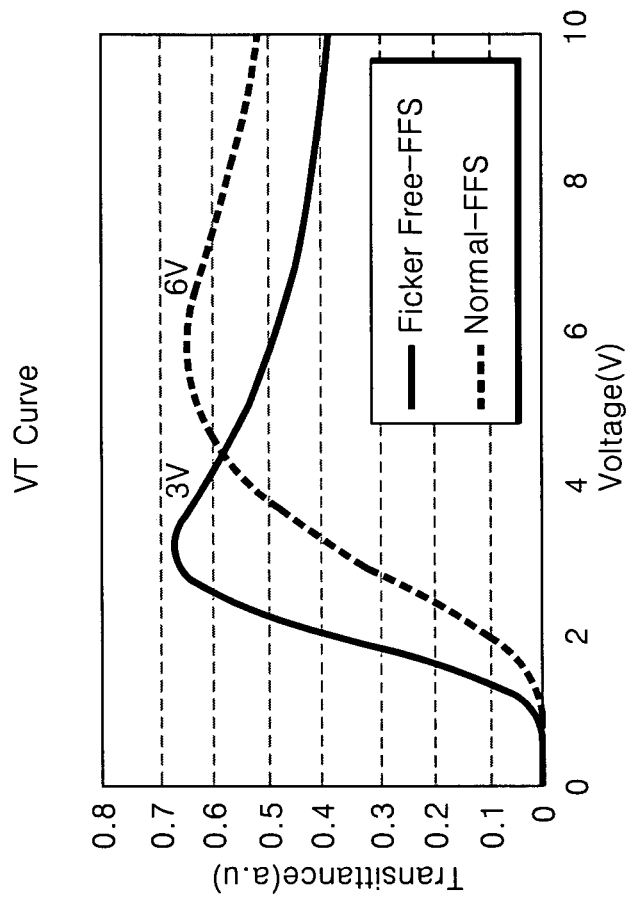
FIG. 13 is an experimental data representing the decrease of a liquid crystal drive voltage of the liquid crystal display device.

Alternatively, the data voltages having different polarities from each other are supplied to the first and second pixel electrode slits 118, 119, thus a potential difference is generated between the first pixel electrode slit 118 and the second pixel electrode slit 119. For example, the drive voltage of the liquid crystal can be reduced from 6V to 3V as in the experimental data, as shown in FIG. 13, thus it is possible to reduce power consumption.

In one embodiment, the method of driving the liquid crystal display device by dividing one pixel into the first and second sub-pixels which have different polarities from each other and express the same gray level can not only be applied to the fringe field switch type liquid crystal display device, but also be applied to the liquid crystal display device of the in-plane switch IPS mode where it is driven by the horizontal electric field between the pixel electrode and the common electrode and of the twisted nematic TN mode where it is driven by the vertical electric field.

In the IPS mode, a common electrode instead of the common electrode plate and the common electrode line shown in FIGS. 9 and 10 is formed parallel to the first and second pixel electrode slits to form the horizontal electric field. The common electrode is formed in a finger shape.

In one embodiment, the liquid crystal display device and the driving method thereof according to the present invention divides the pixel, which realizes any one color of red R, green G and blue B, into the first and second sub-pixels, which have different polarities from each other and have the same gray level, in order to drive, thus the effective value for expressing the gray level is fixed and stored irrespective of the polarity. For example, the same brightness can be expressed irrespective of the common voltage value and the magnitude of the feed-through voltage ΔVp for each frame, thereby solving the flicker problem.

In one embodiment, at the same time, the driving by the positive and negative data is all possible within each pixel. The common voltage value has an optimal value with which the residual image is minimized between the positive data voltage and the negative data voltage while the flicker problem is solved. Accordingly, it is possible to minimize the flickers and the residual images.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device, comprising:
a liquid crystal display panel where pixels are arranged in a matrix shape and comprising a thin film transistor array substrate, a color filter array substrate and a liquid crystal layer therebetween;
a gate driver that is operable to supply gate voltages to the liquid crystal display panel; and
a data driver that is operable to supply data voltages to the liquid crystal display panel,
wherein each pixel includes:
a gate line;
a common electrode plate formed of transparent conductive materials and spaced apart from the gate line;
an insulating film on the gate line and the common electrode plate;
first and second data lines crossing the gate line and on the insulating film;
a first thin film transistor connected to the gate line and the first data line;
a second thin film transistor connected to the same gate line and the second data line;
a passivation film on the first and second thin film transistors;
a plurality of first pixel electrodes connected to the first thin film transistor, disposed on the passivation film, and overlapping the common electrode plate; and
a plurality of second pixel electrodes connected to the second thin film transistor, disposed on the passivation film, and overlapping the common electrode plate, and the first and second pixel electrodes parallel to the first and second data lines, respectively,
wherein the common electrode plate is disposed on a bottom surface of the insulating film, and the first and second pixel electrodes are disposed on a to surface of the passivation film,
wherein the common electrode plate, the plurality of first pixel electrodes, and the first thin film transistor define a first subpixel, and the common electrode plate, the plurality of second pixel electrodes, and the second thin film transistor define a second subpixel,
wherein the plurality of first pixel electrodes are symmetrical to the plurality of second pixel electrodes with respect to a center line that is a half between the first and second data lines and is parallel to the first and second data lines,
wherein a distance between the first pixel electrodes, between the second pixel electrodes, and between the first and second pixel electrodes is substantially identical,
wherein first gaps between the common electrode plate and the first pixel electrode and between the common electrode plate and the second pixel electrode are smaller than a second gap between the thin film transistor array substrate and color filter array substrate to form a fringe field such the long axis of liquid crystals of the liquid crystal layer is in parallel to the thin film transistor array substrate in entire regions of the first and second subpixels,
wherein a first data voltage is supplied to the first pixel electrode via the first data line and the first thin film transistor, a second data voltage is supplied to the second pixel electrode via the second data line and the second thin film transistor, and a common voltage is supplied to the common electrode plate, wherein the common electrode plate and the first and second pixel electrodes are formed on the same thin film transistor array substrate, and wherein a difference voltage between the first data voltage from the first pixel electrode and the common voltage from the common electrode plate is the same in magnitude as a difference voltage between the second data voltage from the second pixel electrode and the common voltage from the common electrode plate to have the same grayscale in the first and second subpixels, and the polarities of the first and second data voltages are contrary to each other.

2. The liquid crystal display device according to claim 1, wherein polarities of the first and second data voltages are inverted for each frame.

3. The liquid crystal display device according to claim 1, wherein the polarity of a pixel voltage supplied to each of the first and second subpixels is inverted for each frame.

4. The liquid crystal display device according to claim 1, wherein the first and second subpixels have a symmetric structure to each other.

5. The liquid crystal display device according to claim 1, wherein the first and second pixel electrodes include a plurality of line-shaped finger parts that are parallel to the data line, respectively.

6. The liquid crystal display device according to claim 1, further comprising:
a common line formed on the common electrode plate for supplying the common voltage to the common electrode plate.

7. The liquid crystal display device according to claim 1, further comprising:
a common line formed on the common electrode plate for supplying the common voltage to the common electrode plate.

8. A liquid crystal display device, comprising:
a liquid crystal display panel where pixels are arranged in a matrix shape and comprising a thin film transistor array substrate, a color filter array substrate and a liquid crystal layer therebetween;
a gate driver that is operable to supply gate voltages to the liquid crystal display panel; and
a data driver that is operable to supply data voltages to the liquid crystal display panel,
wherein each pixel includes:
a gate line;
a plurality of first common electrodes spaced apart from the gate line;
a plurality of second common electrodes parallel to the first common electrodes, the first and second common electrodes formed of transparent conductive materials;
an insulating film on the gate line and the first and second common electrodes;
first and second data lines crossing the gate line and on the insulating film;
a first thin film transistor connected to the gate line and the first data line;
a second thin film transistor connected to the same gate line and the second data line;
a passivation film on the first and second thin film transistors;
a plurality of first pixel electrodes connected to the first thin film transistor, disposed on the passivation film, and formed to be in parallel to the first common electrodes;
a plurality of second pixel electrodes connected to the second thin film transistor, disposed on the passivation film, and formed to be in parallel to the second common electrodes subpixel, and the first and second pixel electrodes parallel to the first and second data lines, respectively;
a common electrode including a plurality of line-shaped finger parts that are parallel to the first and second data lines, is spaced apart from the first and second data lines, and is formed to correspond to the first and second pixel electrodes of the first and second subpixels to supply the same common voltage thereto, wherein the first and second common electrodes are disposed on a bottom surface of the insulating film, and the first and second pixel electrodes are disposed on a top surface of the passivation film, wherein the plurality of common electrodes, the plurality of first pixel electrodes, and the first thin film transistor define a first subpixel, and the plurality of common electrodes, the plurality of second pixel electrodes, and the second thin film transistor define a second subpixel, wherein the plurality of first pixel electrodes and the plurality of first common electrodes are symmetrical to the plurality of second pixel electrodes and the plurality of second common electrodes with respect to a center line that is a half between the first and second data lines and is parallel to the first and second data lines, wherein a distance between the first pixel electrodes, between the second pixel electrodes, and between the first and second pixel electrodes is substantially identical, wherein first gaps between the first common electrode and the first pixel electrode and between the second common electrode and the second pixel electrode are smaller than a second gap between the thin film transistor array substrate and color filter array substrate to form a fringe field such the long axis of liquid crystals of the liquid crystal layer is in parallel to the thin film transistor array substrate in entire regions of the first and second subpixels, wherein a first data voltage is supplied to the first pixel electrode via the first data line and the first thin film transistor, a second data voltage is supplied to the second pixel electrode via the second data line and the second thin film transistor, and a common voltage is supplied to the common electrode, wherein the common electrode and the first and second pixel electrodes are formed on the same thin film transistor array substrate, and wherein a difference voltage between the first data voltage from the first pixel electrode and the common voltage from the common electrode is the same in magnitude as a difference voltage between the second data voltage from the second pixel electrode and the common voltage from the common electrode to have the same grayscale in the first and second subpixels, and the polarities of the first and second data voltages are contrary to each other.

9. A liquid crystal display device, comprising:
a liquid crystal display panel where pixels are arranged in a matrix shape and comprising a thin film transistor array substrate, a color filter array substrate and a liquid crystal layer therebetween;
a gate driver that is operable to supply gate voltages to the liquid crystal display panel; and
a data driver that is operable to supply data voltages to the liquid crystal display panel,
wherein each pixel includes:
first and second gate lines;
a common electrode plate formed of transparent conductive materials and spaced apart from the first and second gate lines;

an insulating film on the first and second gate lines and the common electrode plate;

a data line crossing the first and second gate lines and on the insulating film;

a first thin film transistor connected to the first gate line and the data line;

a second thin film transistor connected to the second gate line and the same data line;

a passivation film on the first and second thin film transistors;

a plurality of first pixel electrodes connected to the first thin film transistor, disposed on the passivation film, and overlapping the common electrode plate subpixel; and a plurality of second pixel electrodes connected to the second thin film transistor, disposed on the passivation film, and overlapping the common electrode plate, the first and second pixel electrodes parallel to the data line, respectively, wherein the common electrode plate is disposed on a bottom surface of the insulating film, and the first and second pixel electrodes are disposed on a top surface of the passivation film, wherein the common electrode plate, the plurality of first pixel electrodes, and the first thin film transistor define a first subpixel, and the common electrode plate, the plurality of second pixel electrodes, and the second thin film transistor define a second subpixel, wherein the plurality of first pixel electrodes are symmetrical to the plurality of second pixel electrodes with respect to a center line that is a half between the adjacent data lines and is parallel to the data line, wherein a distance between the first pixel electrodes, between the second pixel electrodes, and between the first and second pixel electrodes is substantially identical, wherein first gaps between the common electrode plate and the first pixel electrode and between the common electrode plate and the second pixel electrode are smaller than a second gap between the thin film transistor array substrate and color filter array substrate to form a fringe field such the long axis of liquid crystals of the liquid crystal layer is in parallel to the thin film transistor array substrate in entire regions of the first and second subpixels, wherein a first data voltage is supplied to the first pixel electrode via the data line and the first thin film transistor during a first period of one frame, a second data voltage is supplied to the second pixel electrode via the data line and the second thin film transistor during a second period of the one frame, and the common voltage is supplied to the common electrode plate, wherein the common electrode plate and the first and second pixel electrodes are formed on the same thin film transistor array substrate, and wherein a difference voltage between the first data voltage from the first pixel electrode and the common voltage from the common electrode plate is the same in magnitude as a difference voltage between the second data voltage from the second pixel electrode and the common voltage from the common electrode plate to have the same grayscale in the first and second subpixels, and the polarities of the first and second data voltages are contrary to each other.

10. The liquid crystal display device according to claim 9, wherein the polarities of the first and second data voltages are inverted for each frame.

11. The liquid crystal display device according to claim 9, wherein the polarity of a pixel voltage supplied to each of the first and second subpixels is inverted for each frame.

12. The liquid crystal display device according to claim 9, wherein the first and second pixel electrodes include a plurality of line-shaped finger parts that are parallel to the data line.

13. The liquid crystal display device according to claim 9, wherein the second data voltage is supplied to the second pixel electrode after the first data voltage is supplied to the first pixel electrode during the first period.

14. The liquid crystal display device according to claim 9, wherein the common electrode plate is spaced apart from the data line.

15. A liquid crystal display device, comprising:

a liquid crystal display panel where pixels are arranged in a matrix shape and comprising a thin film transistor array substrate, a color filter array substrate and a liquid crystal layer therebetween;

a gate driver that is operable to supply gate voltages to the liquid crystal display panel; and a data driver that is operable to supply data voltages to the liquid crystal display panel, wherein each pixel includes:

first and second gate lines;

a plurality of first common electrodes spaced apart from the first and second gate lines;

a plurality of second common electrodes parallel to the first common electrodes, the first and second common electrodes formed of transparent conductive materials;

an insulating film on the first and second gate lines and the first and second common electrodes;

a data line crossing the first and second gate lines and on the insulating film;

a first thin film transistor connected to the first gate line and the data line;

a second thin film transistor connected to the second gate line and the same data line;

a passivation film on the first and second thin film transistors;

a plurality of first pixel electrodes connected to the first thin film transistor, disposed on the passivation film, and formed in parallel to the first common electrode; and a plurality of second pixel electrodes connected to the second thin film transistor, disposed on the passivation film, and formed in parallel to the second common electrodes, the first and second pixel electrodes parallel to the data line, respectively, wherein the common electrode plate is disposed on a bottom surface of the insulating film, and the first and second pixel electrodes are disposed on a top surface of the passivation film, wherein the plurality of first common electrodes, the plurality of first pixel electrodes, and the first thin film transistor define a first subpixel, and the plurality of common electrodes, the plurality of second pixel electrodes, and the second thin film transistor define a second subpixel, wherein the plurality of first pixel electrodes are symmetrical to the plurality of second pixel electrodes with respect to a center line that is a half between the adjacent data and is parallel to the data line, wherein a distance between the first pixel electrodes, between the second pixel electrodes, and between the first and second pixel electrodes is substantially identical, wherein first gaps between the first common electrode and the first pixel electrode and between the second common electrode and the second pixel electrode are smaller than a second gap between the thin film transistor array substrate and color filter array substrate to form a fringe field such the long axis of liquid crystals of the liquid crystal layer is in parallel to the thin film transistor array substrate in entire regions of the first and second subpixels, wherein a first data voltage is supplied to the first pixel electrode via the data line and the first thin film transistor during a first period of one frame, a second data voltage is supplied to the second pixel electrode via the data line and the second thin film transistor during a second period of the one frame, and the common voltage is supplied to the common electrode, wherein the common electrode and the first and second pixel electrodes are formed on the same substrate, wherein a difference voltage between the first data voltage from the first pixel electrode and the common voltage from the common electrode is the same in magnitude as a difference voltage between the second data voltage from the second pixel electrode and the common voltage from the common electrode to have the same grayscale in the first and second subpixels, and the polarities of the first and second data voltages are contrary to each other.

* * * * *